US009897978B2

(12) United States Patent
Correa et al.

(10) Patent No.: US 9,897,978 B2
(45) Date of Patent: Feb. 20, 2018

(54) CASE CLOSURE DETECTION SYSTEM FOR A PORTABLE OBJECT

(71) Applicant: ETA SA Manufacture Horlogere Suisse, Grenchen (CH)

(72) Inventors: David Correa, Bienne (CH); Jean Laconte, Colombier (CH); Jean-Bernard Veuthey, Marin (CH); Felix Marti, Langendorf (CH)

(73) Assignee: ETA SA Manufacture Horlogère Suisse, Grenchen (CH)

( * ) Notice: Subject to any disclaimer, the term of this patent is extended or adjusted under 35 U.S.C. 154(b) by 0 days.

(21) Appl. No.: 14/786,377

(22) PCT Filed: Apr. 16, 2014

(86) PCT No.: PCT/EP2014/057756
§ 371 (c)(1),
(2) Date: Oct. 22, 2015

(87) PCT Pub. No.: WO2014/173760
PCT Pub. Date: Oct. 30, 2014

(65) Prior Publication Data
US 2016/0070239 A1    Mar. 10, 2016

(30) Foreign Application Priority Data
Apr. 24, 2013   (EP) ..................... 13165188

(51) Int. Cl.
*G04G 17/08*   (2006.01)
*G04G 17/06*   (2006.01)
*H04M 1/02*    (2006.01)

(52) U.S. Cl.
CPC ............ *G04G 17/06* (2013.01); *G04G 17/08* (2013.01); *H04M 1/0262* (2013.01)

(58) Field of Classification Search
CPC ...... G04G 17/04; G04G 17/08; G04G 17/045; G04G 17/06; H04M 1/0262
See application file for complete search history.

(56) References Cited
U.S. PATENT DOCUMENTS 4,939,705 A *  7/1990  Hamilton ............. A61J 7/0436
                                                    221/2
7,251,197 B2 *  7/2007  Yoshida ................ H04B 1/385
                                                    368/10

(Continued)

FOREIGN PATENT DOCUMENTS

EP    2 463 733 A1   6/2012
GB    2 270 445 A    3/1994

OTHER PUBLICATIONS

International Search Report dated Oct. 24, 2014, in PCT/EP2014/057756 filed Apr. 16, 2014.

*Primary Examiner* — Sean Kayes
(74) *Attorney, Agent, or Firm* — Oblon, McClelland, Maier & Neustadt, L.L.P.

(57) ABSTRACT

A portable object including a case middle closed by a back cover, in which an electronic module is placed, the electronic module including a plate to which a printed circuit board is secured, the printed circuit board carrying at least one contact area connected to at least one input of at least one integrated circuit, the integrated circuit supplying at least one signal to an electronic signal processing device. The portable object further includes a detection member changing from at least a first position, indicating that the back cover is secured to the case middle, to a second position, indicating that the back cover is not secured to the case middle.

13 Claims, 2 Drawing Sheets

(56) References Cited

U.S. PATENT DOCUMENTS

| | | | |
|---|---|---|---|
| 2003/0169641 A1* | 9/2003 | O'Neill | G04G 15/00 368/21 |
| 2005/0156611 A1* | 7/2005 | Shinde | G01R 1/07378 324/756.03 |
| 2006/0133215 A1* | 6/2006 | Gordon | G04G 11/00 368/79 |
| 2007/0080871 A1* | 4/2007 | Ying | H01Q 1/22 343/702 |
| 2012/0242399 A1 | 9/2012 | Liu | |
| 2013/0201803 A1 | 8/2013 | Kaltenrieder et al. | |

* cited by examiner

CASE CLOSURE DETECTION SYSTEM FOR A PORTABLE OBJECT

CROSS-REFERENCE TO RELATED APPLICATIONS

This is a National phase Application in the United States of International patent application PCT/EP2014/057756 filed Apr. 16, 2014 which claims priority on European patent application No. 13165188.7 filed Apr. 24, 2013. The entire disclosures of the above patent applications are hereby incorporated by reference.

The invention concerns a portable object comprising a case closed by a back cover and in which an electronic assembly is placed, said electronic assembly including a plate on which is secured a printed circuit board bearing at least one contact area connected to at least one input of at least one integrated circuit, said at least one integrated circuit supplying at least one piece of time information to display means, the portable object further including a detection member able to have at least a first position indicating that the back cover is secured to the case middle and a second position indicating that the back cover is not secured to the case middle.

BACKGROUND OF THE INVENTION

The invention concerns a timepiece structure comprising at least a case middle and a back cover for containing an electronic or electric module. This module is arranged to provide time information and display it via display means such as hands or LCD displays. This module itself includes a plate having a compartment which is arranged to receive an electrical energy accumulator, particularly a battery. The plate may be arranged so that the compartment in which the electrical energy accumulator is placed, occupies almost the entire surface of the plate. For example, it is possible to envisage that the compartment of the plate occupies the entire surface of the plate, with the exception of a peripheral portion defining said compartment. This allows the portable object to operate using a larger electrical energy accumulator which is thus potentially more powerful or has a longer lifetime.

This module further includes a printed circuit board secured to the plate and on which electronic components are arranged, such as at least one integrated circuit like a microcontroller or a memory. These integrated circuits are used to provide time information such as the time or the date which will be displayed.

When the battery is changed, the user must set the watch beforehand to enter standby mode. This standby mode is characterized by the display means which are arranged so that the hands are positioned at midday and so that the LCD displays are switched off. This mode also includes backing-up different settings while continuing, internally, to count time. A capacitor can act as a battery for a certain time period. This setting is little known and complex since it requires entering the watch setting modes.

Consequently, the user who changes the battery does not bother to enter standby mode. Removing the battery thus involves interrupting the electrical power supply and thus stopping the watch functions. The time information is thus lost which means the user has to reset the watch once the battery has been changed.

SUMMARY OF THE INVENTION

It is an object of the invention to overcome the drawbacks of the prior art by proposing to provide a portable object, notably a watch, wherein the battery change is simple, since it requires no additional prior operation, and more reliable.

To this end, the invention concerns a portable object including a case middle closed by a back cover, in which an electronic module is placed, the electronic module including a plate on which a printed circuit board is secured, the printed circuit board carrying at least one contact area connected to at least one input of at least one integrated circuit, the integrated circuit supplying at least one signal to an electronic signal processing device, said portable object further including a detection member changing from at least a first position, indicating that the back cover is secured to the case middle, to a second position, indicating that the back cover is not secured to the case middle, characterized in that the detection member is arranged so that, in one of the first or second positions of the detection member, the back cover is electrically connected to the contact area, so that the change from the first position to the second position causes a change in the logic level at the integrated circuit input so that the electronic module automatically changes into a standby mode.

In a first advantageous embodiment, the detection member includes a metal spring which has a first end and a second end, said plate including an orifice which said spring enters to be secured, via said first end, to the printed circuit board so as to be electrically connected to said at least one contact area.

In a second advantageous embodiment, said at least one contact area includes an electrical path connected to said at least one input of at least one integrated circuit and a metallization to which the second end of the spring is secured.

In a third advantageous embodiment, the detection member includes a helical spring having a first end secured to the printed circuit board, a second end and a pin placed in the space formed by the inner diameter of the spring, the pin having a first end on which a flat head is arranged and a second end secured to the second end of the spring, the pin also being arranged to pass through the plate and the printed circuit board so that the pin head can be connected to the contact area.

In a fourth advantageous embodiment, said at least one contact area includes an electrical path forming an open loop so that the flat pin head can close this loop.

In a fifth advantageous embodiment, the spring is helical.

In another advantageous embodiment, in the standby mode, at least one setting is backed-up and the electronic signal processing device is switched off.

In another advantageous embodiment, the electronic signal processing device includes at least one digital display.

In another advantageous embodiment, the electronic signal processing device further includes at least one hand and the integrated circuit moves said at least one hand to a rest position in the standby mode.

In another advantageous embodiment, the portable object is a watch.

BRIEF DESCRIPTION OF THE DRAWINGS

Other features and advantages of the invention will appear upon reading the following detailed description, with reference to the annexed drawings, in which.

DETAILED DESCRIPTION OF PREFERRED EMBODIMENTS

Figure 1:
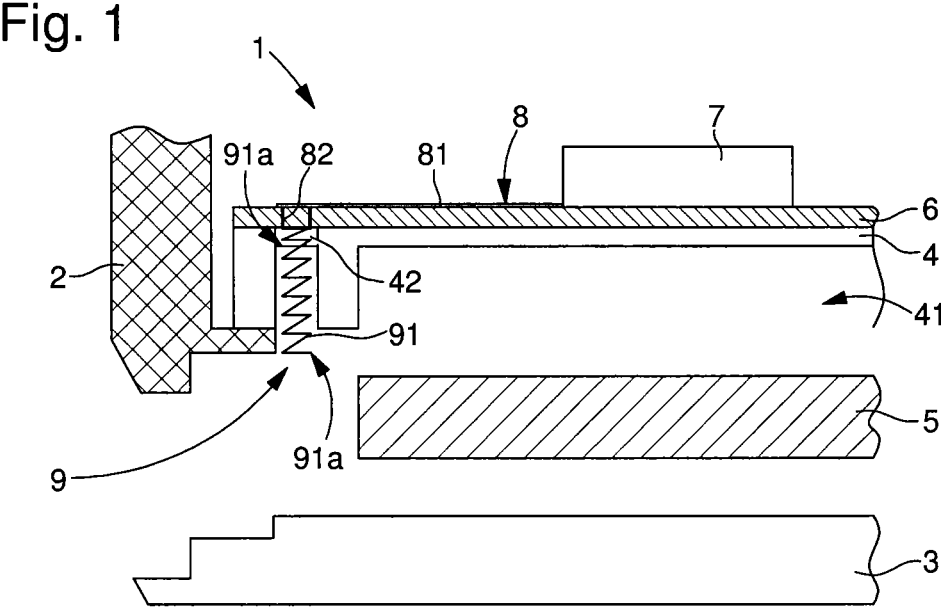
FIGS. 1 and 2 are schematic views of a first embodiment of the invention.

The invention concerns the field of horology, and in particular the field of watches comprising at least one electronic or electrical circuit powered by an accumulator such as a cell battery or similar. The invention concerns a structure 1 of a timepiece 100, particularly a watch, comprising at least a case middle 2 and a back cover 3 for containing an electronic or electric assembly or module 10 seen in FIG. 1. This case middle 2 closed by a back cover 3 makes it possible to form a watch case. This case middle is also closed by a crystal. This module 10 is arranged to supply signals to an electronic signal processing device. The signals may be time information transmitted to display means, such as hands or LCD digital displays. This module 10 in turn includes a plate 4, a compartment 41 of which is arranged to receive an electrical energy accumulator 5, particularly a cell battery. Plate 4 may be arranged so that compartment 41, in which the electrical energy accumulator is placed, occupies almost the entire surface of plate 4. For example, it is possible to envisage that compartment 41 of plate 4 occupies the entire surface of the plate, with the exception of a peripheral portion defining said compartment 41. This allows the portable object to operate using a larger electrical energy accumulator which is thus potentially more powerful or has a longer lifetime.

This module 10 further includes a printed circuit board 6 secured to plate 4 and on which are arranged at least one integrated circuit 7 and at least one electrical contact area 8. For example, integrated circuit 7 is a microcontroller or a memory. Electronic module 10 may of course include a microcontroller and a memory.

According to the invention, module 10 further includes a member 9 for detecting the closure of case 3. Preferably, this detection member 9 is an elastic detection member. This detection member is arranged to change from at least a first position, indicating that back cover 3 is secured to case middle 2, to a second position, indicating that back cover 3 is not secured to case middle 2.

Figure 2:
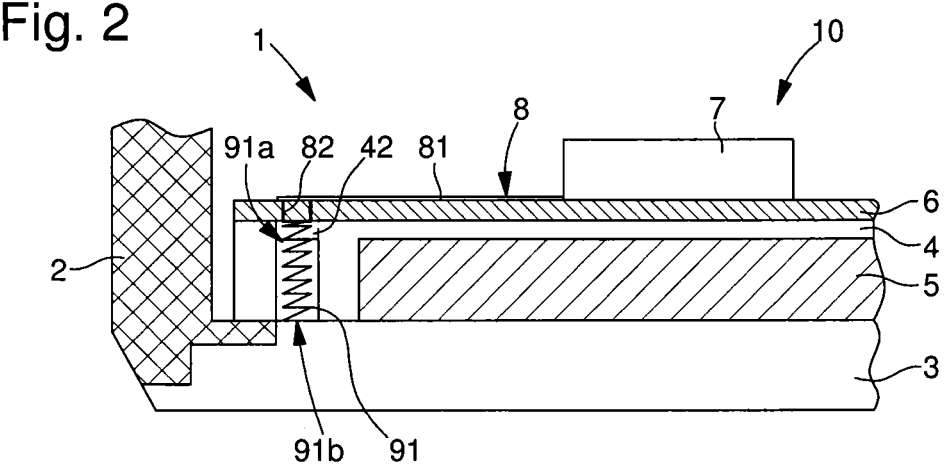

In a first embodiment seen in FIGS. 1 and 2, detection member 9 is able to detect the presence of a back cover made of metal. In such case, detection member 9 includes a metal spring 91 secured to plate 4 and acting as a contact piece. This spring 91 includes a first end 91a and a second end 91b. For this purpose, a peripheral area of plate 4 is provided with a through hole 42. The detection member is placed in this through hole 42. Spring 91 is secured by its first end 91b to printed circuit board 6, generally on the face of printed circuit board 6 in contact with plate 4. Printed circuit board 6 is arranged so that the end of the spring forming the detection member is connected to contact area 8. For example, a contact area 8 may be formed by an electrical path 81 on printed circuit board 6 and a metallization 82 allowing the spring 91 secured to the face of printed circuit board 6 in contact with plate 4 to be electrically connected to electrical path 81.

While back cover 3 is not secured to case middle 2 as seen in FIG. 1, the second end 91b of spring 91 is free, i.e. it is not in contact with any other element.

When back cover 3 is secured to case middle 2, as seen in FIG. 2, the second end 91b of spring 91 enters into contact with said back cover 3 and spring 91 tends to contract. Consequently, back cover 3 becomes electrically connected to contact area 8 via metal spring 91. A rising edge and a high logic level are detected by integrated circuit 7 indicating that back cover 3 is attached.

When back cover 3 is detached from case middle 2, the stress exerted on the spring is no longer present and second end 91b of spring 91 is no longer in contact with said back cover 3. Consequently, integrated circuit 7 detects a falling edge and a low logic level indicating that back cover 3 has been removed.

Detection of the falling edge and the low logic level indicating that back cover 3 has been removed is interpreted by integrated circuit 7 as being a preliminary step to a change of battery 5. This battery change means that electronic module 10 will no longer be powered with electrical energy for a period of time. Electronic module 10 will then automatically change into a standby or "SLEEP" mode. This standby mode is characterized by the electronic signal processing device which is placed on standby. The display means are arranged so that the hands are positioned at midday and the LCD display or displays are switched off. This mode also includes backing-up various settings, which may be data or time settings, while continuing to count time internally. A capacitor can act as a battery for a certain time period.

This feature advantageously allows an automated change to standby mode, which is completely automatic and imperceptible to the user who therefore does not need to perform the change.

When back cover 3 is secured to case middle 2 again, back cover 3 is electrically connected to contact area 8 via metal spring 91. A rising edge and a high logic level are detected by integrated circuit 7 indicating that back cover 3 is attached. Integrated circuit 7 then changes from standby mode to the normal mode in which the time is displayed by the hands and/or the LCD displays.

Figure 3:
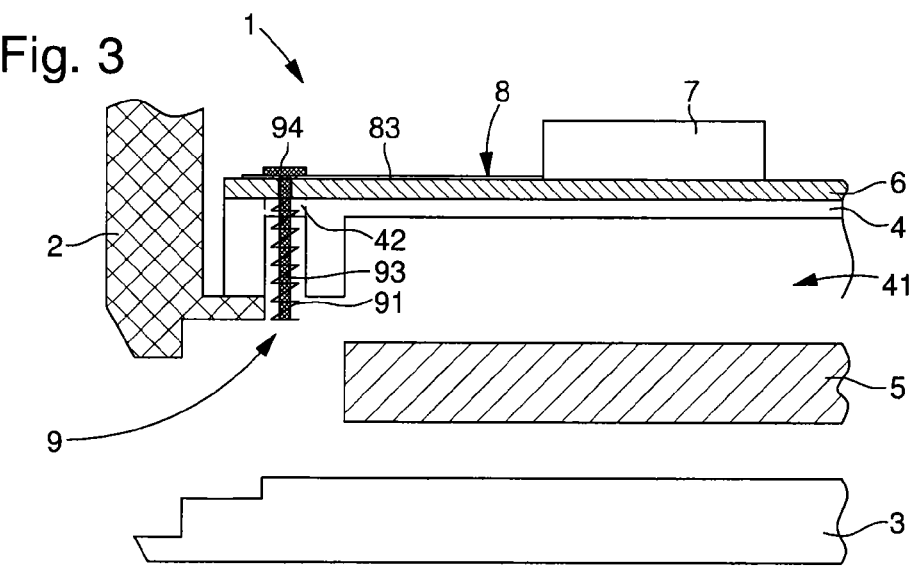
FIGS. 3 and 4 show schematic views of a second embodiment of the invention.
Figure 4:
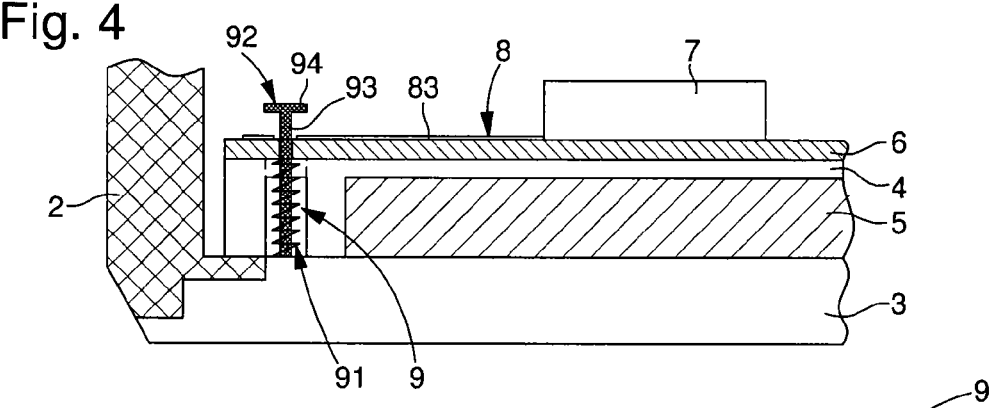

In a second embodiment in FIGS. 3 and 4, detection member 9 is able to detect the presence of a back cover made in any material, particularly plastic. In this case, detection member 9 includes a spring 91, which may or may not be metal, attached to plate 4. This spring 91 includes a first end 91a and a second end 91b. For this purpose, the peripheral area of plate 4 is provided with a through hole 42. The detection member 9 is placed in through hole 42. Detection member 9 is secured by its first end 91b to printed circuit board 6, generally on the face of printed circuit board 6 in contact with plate 4. This spring acts as a return piece.

Figure 5:
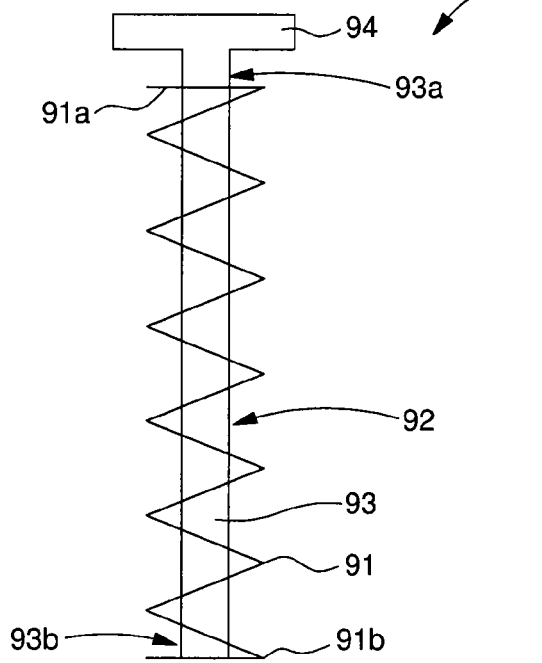
FIG. 5 is a schematic view of a detection member according to the second embodiment of the invention.

In fact, the detection member 9 seen in FIG. 5 further includes a contact element 92 This element includes a pin 93 having two pin ends 93a, 93b. At a first pin end 93a, a flat head 94 is arranged so that the second pin end 93b of pin 93 is free. This pin 93 is placed in the space formed by the inner diameter of helical spring 91. The free end of pin 93 is fixed to the second end 91b of spring 91. Pin 93 is also arranged to be placed in through hole 42 so that the head 94 of pin 93 is connected to contact area 8. For this purpose, printed circuit board 6 also includes a hole through which pin 93 passes. This contact area 8 is then formed by an electrical path 83 on printed circuit board 6 which is cut in two by the hole. For example, electrical path 83 forms a loop that can be opened or closed by head 94 of pin 93.

When back cover 3 is attached to case middle 2 as seen in FIG. 4, the second end 91b of spring 91 enters into contact with said back cover 3 and spring 91 then contracts. Consequently, pin 93 attached to spring 91 follows the contraction of spring 91. Thus, the flat head of pin 93 is not in contact with contact area 8. The electrical path 83 forming a loop is thus open. A falling edge and a low logic level or "0" are then detected. In the case of this second embodiment, this logic level is interpreted as meaning that back cover 3 is attached.

When back cover 3 is removed from case middle 2 as seen in FIG. 3, the second end 91*b* of spring 91 becomes free, i.e. it is not in contact with any other element. Consequently, spring 91 is no longer subject to any stress and relaxes. Consequently, flat head 94 of pin 93 enters into contact with contact area 8. Electrical path 83 forming a loop is then closed. A rising edge and a high logic level or "1" are thus detected. In the case of the second embodiment, this logic level is interpreted as meaning that back cover 3 is no longer attached.

Detection of the high logic level meaning that back cover 3 has been removed is interpreted by integrated circuit 7 as being a preliminary step to a change of battery 5. This change of battery 5 means that electronic module 10 will no longer be powered with electrical energy during a period of time. Integrated circuit 7 will then automatically change into a standby or "SLEEP" mode.

It will be understood that when back cover 3 is attached to the case middle again, the flat pin head is moved such that the loop formed by the electrical path is opened. Integrated circuit 7 interprets a change of operating mode and changes back into normal mode again.

Spring 91 can be secured to printed circuit board 6 by using an adhesive or a weld or braze or any other possible methods.

It will be clear that various alterations and/or improvements and/or combinations evident to those skilled in the art may be made to the various embodiments of the invention set out above without departing from the scope of the invention defined by the annexed claims.

The invention claimed is:

1. A portable object comprising:
a case middle closed by a back cover, in which an electronic module is placed, the electronic module including a plate to which a printed circuit board is secured, the printed circuit board carrying at least one contact area connected to at least one input of at least one integrated circuit, the integrated circuit supplying at least one signal to an electronic signal processing device;
a detection member changing from at least a first position, indicating that the back cover is secured to the case middle, to a second position, indicating that the back cover is not secured to the case middle,
wherein the detection member is arranged so that, in one of the first or second positions of the detection member, the back cover is electrically connected to the contact area, so that an input of the integrated circuit is arranged for changing a logic level during a change from the first position to the second position so that the change of the electronic module into a standby mode is automatic, and
wherein the detection member includes a helical spring positioned between the printed circuit board and the back cover and having a first end secured to the printed circuit board.

2. The portable object according to claim 1, wherein the detection member includes a metal spring which has a first end and a second end, the plate including an orifice which the metal spring enters to be secured, via the first end, to the printed circuit board to be electrically connected to the at least one contact area.

3. The portable object according to claim 2, wherein the at least one contact area includes an electrical path connected to the at least one input of at least one integrated circuit and a metallization to which the second end of the spring is secured.

4. The portable object according to claim 2, wherein the metal spring is helical.

5. The portable object according to claim 1, wherein the detection member include a second end and a pin placed in the space formed by the inner diameter of the spring, the pin having a first pin end on which a flat head is arranged and a second pin end secured to a second end of the spring, the pin also being arranged to pass through the plate and the printed circuit board so that the pin head can be connected to the contact area.

6. The portable object according to claim 5, wherein the at least one contact area includes an electrical path forming an open loop so that the flat pin head can close the loop.

7. The portable object according to claim 1, wherein, in the standby mode, at least one setting is backed-up and the electronic signal processing device is switched off.

8. The portable object according to claim 7, wherein the electronic signal processing device includes at least one digital display.

9. The portable object according to claim 7, wherein the electronic signal processing device further includes at least one hand and the integrated circuit moves the at least one hand to a rest position in the standby mode.

10. The portable object according to claim 8, wherein the electronic signal processing device further includes at least one hand and the integrated circuit moves the at least one hand to a rest position in the standby mode.

11. The portable object according to claim 1, wherein the object is a watch.

12. A portable object comprising:
a case middle closed by a back cover, in which an electronic module is placed, the electronic module including a plate to which a printed circuit board is secured, the printed circuit board carrying at least one contact area connected to at least one input of at least one integrated circuit, the integrated circuit supplying at least one signal to an electronic signal processing device; and
a detection member changing from at least a first position, indicating that the back cover is secured to the case middle, to a second position, indicating that the back cover is not secured to the case middle,
wherein the detection member is arranged so that, in one of the first or second positions of the detection member, the back cover is electrically connected to the contact area, so that an input of the integrated circuit is arranged for changing a logic level during a change from the first position to the second position so that the change of the electronic module into a standby mode is automatic,
wherein, in the standby mode, at least one setting is backed-up and the electronic signal processing device is switched off, and
wherein the electronic signal processing device further includes at least one hand and the integrated circuit moves the at least one hand to a rest position in the standby mode.

13. A portable object comprising:
a case middle closed by a back cover, in which an electronic module is placed, the electronic module including a plate to which a printed circuit board is secured, the printed circuit board carrying at least one contact area connected to at least one input of at least one integrated circuit, the integrated circuit supplying at least one signal to an electronic signal processing device; and a detection member changing from at least a first position, indicating that the back cover is secured to the case middle, to a second position, indicating that the back cover is not secured to the case middle, wherein the detection member is arranged so that, in one of the first or second positions of the detection member, the back cover is electrically connected to the contact area, so that an input of the integrated circuit is arranged for changing a logic level during a change from the first position to the second position so that the change of the electronic module into a standby mode is automatic, wherein, in the standby mode, at least one setting is backed-up and the electronic signal processing device is switched off, wherein the electronic signal processing device includes at least one digital display, and wherein the electronic signal processing device further includes at least one hand and the integrated circuit moves the at least one hand to a rest position in the standby mode.

* * * * *